(12) United States Patent
Lavin et al.

(10) Patent No.: US 12,094,173 B1
(45) Date of Patent: Sep. 17, 2024

(54) PART POSITION RECOGNITION FOR PRINTING ELECTRICAL OR OPTICAL INTERCONNECTS

(71) Applicant: National Technology & Engineering Solutions of Sandia, LLC, Albuquerque, NM (US)

(72) Inventors: Judith M. Lavin, Albuquerque, NM (US); Andrew T. Wilson, Albuquerque, NM (US); Alfred J. Thibodeaux, Albuquerque, NM (US); Yongkun Sui, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 115 days.

(21) Appl. No.: 18/111,801

(22) Filed: Feb. 20, 2023

(51) Int. Cl.
```
B41J 29/38      (2006.01)
B29C 64/393     (2017.01)
B33Y 50/02      (2015.01)
G06T 7/00       (2017.01)
G06T 7/33       (2017.01)
G06T 7/80       (2017.01)
```
(52) U.S. Cl.
CPC .............. G06T 7/80 (2017.01); G06T 7/001 (2013.01); G06T 7/337 (2017.01); *G06T 2207/30144* (2013.01); *G06T 2207/30148* (2013.01)

(58) Field of Classification Search
CPC .......... G06T 7/80; G06T 7/001; G06T 7/337; G06T 2207/30144; G06T 2207/30148
See application file for complete search history.

(56) References Cited

U.S. PATENT DOCUMENTS

| | | | |
|---|---|---|---|
| 10,322,545 B1* | 6/2019 | Hines | B33Y 50/02 |
| 2010/0207291 A1* | 8/2010 | Eidenschink | B29C 48/05 72/264 |
| 2017/0226362 A1* | 8/2017 | Fratello | G01L 1/2287 |
| 2018/0354037 A1* | 12/2018 | Thuo | H05K 3/125 |

* cited by examiner

*Primary Examiner* — Howard D Brown, Jr.
(74) *Attorney, Agent, or Firm* — Mark A. Dodd

(57) ABSTRACT

A method for direct write printing of an electrical or optical element based upon a generated master actual position map and a master expected position map is disclosed. The generated master actual position map is generated by efficiently stitching together a number of images using a hierarchical stitching process. Once the desired location of the electrical or optical element is determined by comparing the master actual position map with the master expected position map, a corresponding toolpath for a direct write printer is generated. The direct write printer then direct write prints the electrical or optical element using the generated toolpath. By using different types of inks, the electrical element may be a trace, a resistor, an inductor, a transformer, a capacitor, or some combination thereof. In like manner, the optical element may be a waveguide, a beam-splitter, a phase shifter, an optical attenuator, an interferometer, or some combination thereof.

20 Claims, 7 Drawing Sheets

PART POSITION RECOGNITION FOR PRINTING ELECTRICAL OR OPTICAL INTERCONNECTS

STATEMENT OF GOVERNMENT INTEREST

This invention was made with Government support under Contract No. DE-NA0003525 awarded by the United States Department of Energy/National Nuclear Security Administration. The Government has certain rights in the invention.

TECHNICAL FIELD

The present invention relates to the determination of the position of multiple electrical or optical components and the subsequent direct write printing of electrical traces to interconnect the electrical components or optical waveguides to interconnect the optical components.

BACKGROUND

Electronic devices are now being fabricated using hybrid integration (HI), in which various portions of the overall electronic devices are formed using different technologies, but then must be electrically interconnected via traces. For example, multiple integrated circuit (IC) die may be located on a single carrier substrate, with traces required to route signals between various bond pads on the various IC die. These traces may, for example, be formed using direct write printing. While the positions of the various bond pads on the IC die are nominally known, even minor misalignments (translations and/or rotations) in positions may result in direct write printed traces that do not interconnect the bond pads on the various IC die as desired. This becomes an ever greater issue as the size of the bond pads on the various IC die or the widths of the direct write printed traces decrease, for example, to less than 100 µm. In particular, an imager producing an image having sufficient resolution to accurately locate the various bond pads on the IC die has a field of view that may be far smaller than the overall carrier substrate with its multiple IC die. Thus, while the actual location of one bond pad may be accurately determined by the imager, the actual location of the bond pad on the other end of the desired direct write printed trace may be unknown as it falls outside the field of view of the imager. Alternatively, an imager producing an image of the overall carrier substrate with its multiple IC die will have insufficient resolution to accurately locate the bond pads on the various IC die.

A similar issue can arise when various elements of a single device must be electrically interconnected after the various elements are potted, for example, in an epoxy. As the various elements may shift during the potting process, one is again faced with elements having a known nominal position, but with unknown misalignment (translation and/or rotation) in position. Also as noted above, one is again faced with incompatible imager requirements of both high resolution for accurate element locating and a wide field of view to image the entire device.

Direct write printing of traces offers a number of benefits. For example, it allows one to selectively electrically interconnect various points. This is especially helpful during development phases of a project and for smaller production runs when the limited number of parts does not justify the cost of a custom printed circuit board. Direct write printing also offers the advantage that one may specify the width of the traces, in some cases down to as narrow as approximately 10 µm, a width that is generally not feasible with a custom printed circuit board. These narrow direct write printed traces can thus be placed closer together, and are compatible with smaller bond pads.

While the above discussion identified difficulties faced by the placement of electrical interconnects, similar issues are faced by the placement of optical interconnects, for example, optical waveguides. These optical interconnects may, for example, be used to route optical signals between and among optical devices, including photonic integrated circuits (PICs). These optical devices may include, for example, optical sources such as lasers, optical detectors such as photodiodes, and active or passive optical elements such as beam-splitters, filters, attenuators, phase shifters, modulators, interferometers, etc.

Thus, the need exists for an approach that addresses the conflicting imaging needs for accurately locating direct write printed traces that electrically interconnect the bond pads on multiple IC die or multiple elements. In like manner, the need exists for an approach that addresses the conflicting imaging needs for accurately locating direct write printed waveguides that optically interconnect optical devices.

SUMMARY

One aspect of the present invention relates to direct write printing of an electrical (or optical) element based upon a generated master actual position map and a master expected position map. The generated master actual position map is generated by efficiently stitching together a number of images using a hierarchical stitching process. Once the desired location of the electrical (or optical) element is determined by comparing the master actual position map with the master expected position map, a corresponding toolpath for a direct write printer is generated. The direct write printer then direct write prints the electrical (or optical) element using the generated toolpath. By using different types of inks, the electrical element may be a trace, a resistor, an inductor, a transformer, a capacitor, or some combination thereof. In like manner, by using different types of inks, the optical element may be a waveguide, a beam-splitter, a phase shifter, an optical attenuator, an interferometer, or some combination thereof.

In at least one embodiment of the invention, a method for adaptive printing of an element using a direct write printer comprises the steps of using an imager, taking a plurality of images of a surface upon which the element is to be direct write printed (each of the plurality of images overlapping a portion of each adjacent image), stitching together the plurality of images using a hierarchical stitching process (thereby generating a master actual position image), calibrating the imager using the imager to take a calibration image of a two-dimensional calibration target (thereby generating calibration data), generating a master actual position map based upon the master actual position image and the calibration data, comparing the master actual position map to a master expected position map (the master expected position map including expected locations of one or more features on the surface and corresponding identities of the one or more features to thereby identify the one or more features in the master actual position map), determining an actual location on the surface for the element based upon the master actual position map with the thus identified one or more features, generating a toolpath corresponding to the thus determined actual location on the surface for the element, and using the direct write printer, direct write printing the element based upon the thus generated toolpath.

In various embodiments, the element is an electrical element (the electrical element including a trace, a resistor, an inductor, a transformer, and/or a capacitor); the element is an optical element (the optical element including a waveguide, an optical coupler, and/or an optical splitter); the element includes a phase shifter, an optical attenuator, and/or an interferometer; and the direct write printer is one of an aerosol jet printer, a direct ink writer, or an ink jet printer.

In other embodiments, the hierarchical stitching process includes the steps of setting a counter i to zero, stitching together 2×2 $4^i$-block images from the plurality of images (thereby creating $4^{i+1}$-block images), determining whether one $4^{i+1}$-block image includes each of the plurality of images, and when the one $4^{i+}$-block image does not include each of the plurality of images, incrementing the counter i and repeating the steps of stitching and determining; and the hierarchical stitching process includes the steps of setting a counter i to zero, stitching together A×B $(A \times B)^i$-block images from the plurality of images (thereby creating $(A \times B)^{i+}$-block images), determining whether one $(A \times B)^{i+}$-block image includes each of the plurality of images, and when the one $(A \times B)^{i+}$-block image does not include each of the plurality of images, incrementing the counter i and repeating the steps of stitching and determining.

In yet other embodiments, the calibration data compensates for at least one of magnification, translation, and/or rotation between the two-dimensional calibration target and the calibration image; the master expected position map includes a CAD drawing of one or more of a carrier substrate, one or more IC die, one or more bond pads of the one or more IC die, one or more optical die, one or more optical ports of the one or more optical die, and/or individual elements of a device, and the one or more of the carrier substrate, one or more IC die, one or more bond pads of the one or more IC circuit die, one or more optical die, one or more optical ports of the one or more optical die, and/or individual elements of the device correspond to the one or more features on the surface; and the step of direct write printing employs at least one ink, each of the at least one inks containing one of a conductive material, a magnetic material, a dielectric material, a ceramic material, a monomer material, a polymer material, an electro-optical material, or a thermo-optical material.

In at least one embodiment of the invention, a computer-readable storage media comprising instructions to implement adaptive printing of an element using a direct write printer, the instructions implementing the steps comprising using an imager, taking a plurality of images of a surface upon which the element is to be direct write printed (each of the plurality of images overlapping a portion of each adjacent image), stitching together the plurality of images using a hierarchical stitching process (thereby generating a master actual position image), calibrating the imager using the imager to take a calibration image of a two-dimensional calibration target (thereby generating calibration data), generating a master actual position map based upon the master actual position image and the calibration data, comparing the master actual position map to a master expected position map (the master expected position map including expected locations of one or more features on the surface and corresponding identities of the one or more features to thereby identify the one or more features in the master actual position map), determining an actual location on the surface for the element based upon the master actual position map with the thus identified one or more features, generating a toolpath corresponding to the thus determined actual location on the surface for the element, and using the direct write printer, direct write printing the element based upon the thus generated toolpath.

In various embodiments, the element is an electrical element (the electrical element including a trace, a resistor, an inductor, a transformer, and/or a capacitor); the element is an optical element (the optical element including a waveguide, an optical coupler, and/or an optical splitter); the element includes a phase shifter, an optical attenuator, and/or an interferometer; and the direct write printer is one of an aerosol jet printer, a direct ink writer, or an ink jet printer.

In other embodiments, the hierarchical stitching process includes the steps of setting a counter i to zero, stitching together 2×2 $4^i$-block images from the plurality of images (thereby creating $4^{i+}$-block images), determining whether one $4^{i+}$-block image includes each of the plurality of images, and when the one $4^{i+}$-block image does not include each of the plurality of images, incrementing the counter i and repeating the steps of stitching and determining; and the hierarchical stitching process includes the steps of setting a counter i to zero, stitching together (A×B) $(A \times B)^i$-block images from the plurality of images (thereby creating $(A \times B)^{i+}$-block images), determining whether one $(A \times B)^{i+}$-block image includes each of the plurality of images, and when the one $(A \times B)^{i+1}$-block image does not include each of the plurality of images, incrementing the counter i and repeating the steps of stitching and determining.

In yet other embodiments, the calibration data compensates for at least one of magnification, translation, and/or rotation between the two-dimensional calibration target and the calibration image; the master expected position map includes a CAD drawing of one or more of a carrier substrate, one or more IC die, one or more bond pads of the one or more IC die, one or more optical die, one or more optical ports of the one or more optical die, and/or individual elements of a device, and the one or more of the carrier substrate, one or more IC die, one or more bond pads of the one or more IC die, one or more optical die, one or more optical ports of the one or more optical die, and/or individual elements of the device correspond to the one or more features on the surface; and the step of direct write printing employs at least one ink, each of the at least one inks containing one of a conductive material, a magnetic material, a dielectric material, a ceramic material, a monomer material, a polymer material, an electro-optical material, or a thermo-optical material.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

DETAILED DESCRIPTION

Figure 1:
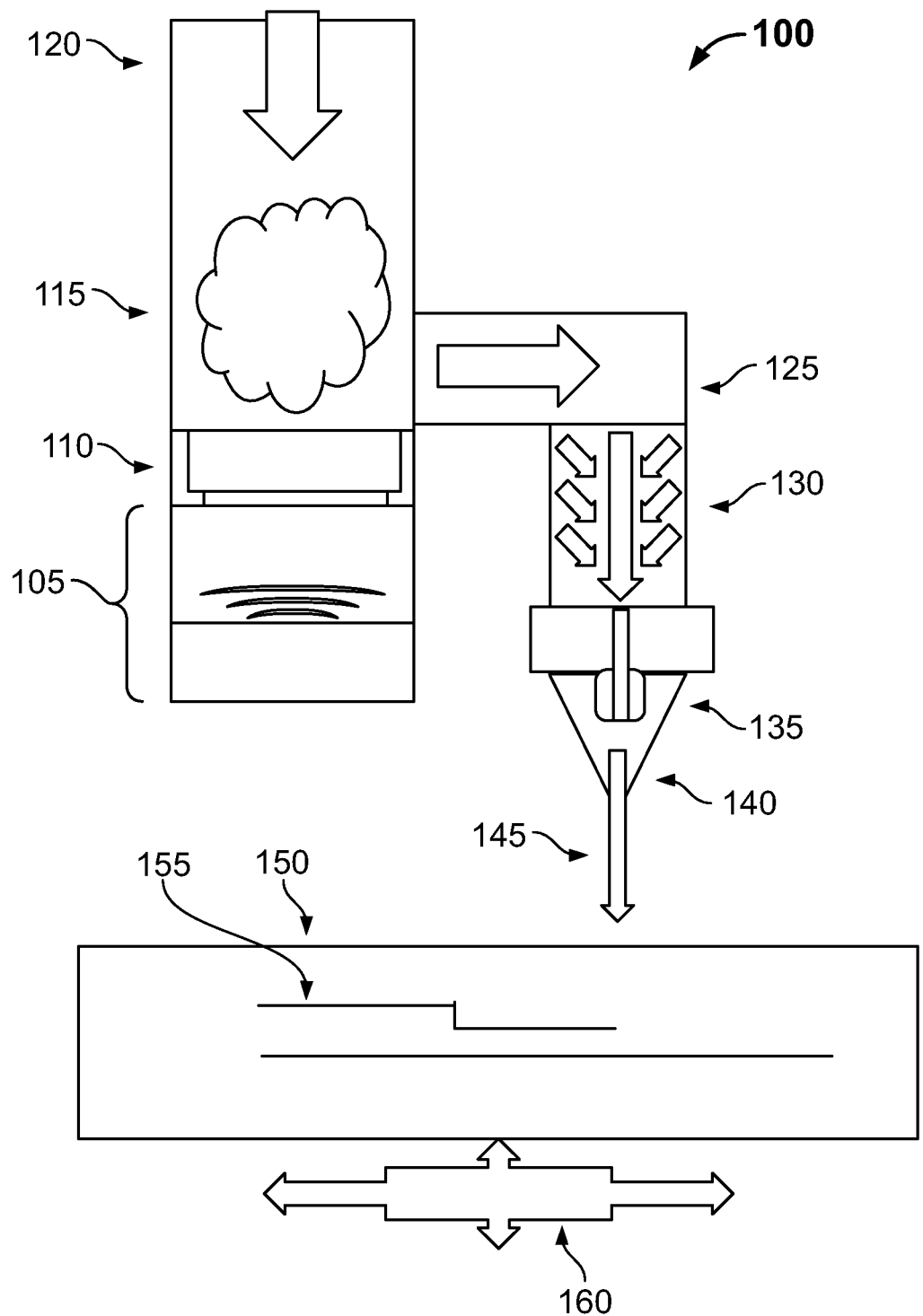
FIG. 1 illustrates an aerosol jet printer (AJP) that may be used in an adaptive printing process in accordance with one or more embodiments of the present invention.

Various embodiments of the present invention relate to direct write printing of traces to electrically interconnect various elements or components of an overall device. As the precise location, including any potential translation and/or rotation, of the various elements or components is initially unknown, the printing solution is termed "adaptive printing." One direct write printing tool that is readily amenable to adaptive printing is an aerosol jet printer (AJP) 100, as illustrated in FIG. 1. An exemplary AJP 100 is the "Nanojet" printer from Integrated Deposition Solutions. The AJP 100 includes an atomizer 105 for atomizing the ink 110. For successful atomization, the ink 110 preferably has a viscosity of less than 10 centipose (cP). The resulting ink mist 115 is transported by an aerosol gas 120. The ink mist 115 plus the aerosol gas 120 enters a chamber 125, where a sheath gas 130 is used to confine the radial dimension of the ink mist 115 plus aerosol gas 120. A focus lens 135 in the form of an orifice, further focusses the flow of the ink mist 115, aerosol gas 120, and sheath gas 130. The flow of the ink mist 115, aerosol gas 120, and sheath gas 130 exits the chamber 125 via a nozzle 140 as an ink stream 145. A substrate 150, upon which the desired electrical traces 155 will be formed, is located on a translation stage 160, which moves the substrate 150 with respect to the ink stream 145 in the X- and Y-directions. The motion of the translation stage 160 is controlled by a computer (not illustrated) using standard computer numerical control (CNC) software. While the fundamental width of the electrical traces 155 is 10 to 100 μm, wider electrical traces 155 can be printed using a serpentine path due to the flexibility of the CNC-controlled translation stage 160.

The atomizer 105 may be implemented in any suitable manner that creates the desired ink mist 115. The atomizer 105 may, for example, take the form of a jet nebulizer in which a stream of the aerosol gas 120 is forced through the ink 110. The atomizer 105 may alternatively employ ultrasonic waves to create the ink mist 115 that is subsequently transported by the aerosol gas 120. The atomizer 105 may also alternatively employ a vibrating mesh on the surface of the ink 110 that again generates the ink mist 115 that is subsequently transported by the aerosol gas 120. In yet other embodiments, the atomizer 105 may employ heat to evaporate the ink 110, thereby generating the ink mist 115 that is subsequently transported by the aerosol gas 120. From a cost standpoint, both the aerosol gas 120 and the sheath gas 130 are preferably room air.

The ink 110 may have any composition consistent with the desired highly conductive electrical traces, though silver-, copper-, and gold-bearing conductive inks, i.e., conductive-material-containing inks, are preferred. Note that the AJP 100 can be used to print a variety of materials, such that many different elements within a device may be formed by AM using a single tool. A magnetic core layer, such as might be used in an inductor or transformer, may be formed, for example, using a magnetite ($Fe_3O_4$)-containing ink, i.e., a magnetic-material-containing ink. A dielectric layer may be formed, for example, using tetraethyl orthosilicate (TEOS), i.e., a dielectric-material-containing ink. A ceramic layer, for example, alumina and zirconia, may be printed using aluminum- and zirconium-containing inks, respectively. Plastic material may be printed using various monomer- or polymer-material-containing inks. In applications requiring optical interconnects, for example, waveguides, these waveguides may readily be printed using a dielectric-, a monomer-, or a polymer-material-containing ink. By employing multiple inks and corresponding multiple toolpaths, waveguides having both a core and a cladding layer may be printed.

As will be appreciated by those of ordinary skill in the art, the narrowest linewidth will be achieved when the focus of the ink stream 145 is located at approximately the surface of the substrate 150. If multiple different linewidths are required for a given application, this can readily be achieved by moving the location of the focus. In other words, by defocusing the ink stream 145 relative to the surface of the substrate 150, different linewidths can readily be achieved. This defocusing of the ink stream 145 may be achieved by employing a translation stage 160 that includes motion in the Z-(vertical) direction. The focus may also be adjusted by altering the pressure and/or flowrate of the sheath gas 130. As an example, the focusing ratio, defined as the ratio of the flow of the sheath gas 130 to the flow of the aerosol gas 120, may be changed. By increasing the focusing ratio, for example by increasing the flow of the sheath gas 130, the linewidth decreases. Typical focusing ratios are in the range of 2-8, though higher focusing ratios may be used for the narrowest electrical traces. Further, the width of the electrical trace 155 may be increased by printing a serpentine path with a narrower width ink stream 145.

As the minimum linewidth may be important for some applications of the present invention, the temperature of the substrate 150 during the printing process should be optimized. As typical ink formulations include both terpineol and xylenes, there are competing temperature processes. At higher temperatures, the viscosity of the terpineol decreases, which would increase the spreading and thus the minimum linewidth. In contrast, at higher temperatures the xylenes will evaporate faster, which would decrease spreading and thus the minimum linewidth. To study the effect of substrate 150 temperature on linewidth, an ink formulation of 20% UTDots Ag40x silver nanoparticle ink, 20% terpineol, and 60% xylenes on a volume basis was used. While the measured minimum linewidths were a function of the flowrate for the aerosol gas 120 and the speed of the CNC-controlled translation stage 160, the linewidths generally decreased as the substrate 150 temperature increased to 80° C. to 100° C.

To reduce the resistance of the electrical traces printed by the AJP 100, multiple sub-layers, i.e., printing passes, may be used to increase the overall thickness (or height) of the printed electrical traces 155. The overall thickness of the printed electrical traces 155 is a fairly linear function of the number of sub-layers, with the average thickness of each sub-layer for the given ink formulation being 0.20-0.25 μm. The ink formulation in this experiment was: 20% UTDots Ag40x silver nanoparticle ink, 20% terpineol, and 60% xylenes on a volume basis. The terpineol acted as a low volatility binder to fix the silver nanoparticles in place while the xylenes evaporated on the heated substrate 150 during and immediately after printing. The substrate 150 is preferably heated to a temperature in the range of 80° C. to 100° C. The printed electrical traces 155 are preferably furnace annealed in air at a temperature in the range of 175° C. to 225° C. for two to four hours.

While the above described one type of direct write printer, in the form of an AJP, other direct write printers are known in the art. These may include, for example, a syringe-based extruding system, which is also known as a direct ink writer (DIW), in which different sized nozzles permit the direct write printing of traces having different widths. An ink jet printer is yet another type of direct write printer. In both DIWs and ink jet printers, the extruded or jetted "ink" is conductive, just as it is for the more fully described AJP. These alternative direct write printers may employ a fixed printing head while placing the object to be printed on a CNC-controlled translation stage, as with the AJP described above. Alternatively, the object to be printed may be fixed, while the printing head may be moved on a CNC-controlled translation stage.

Figure 2A:
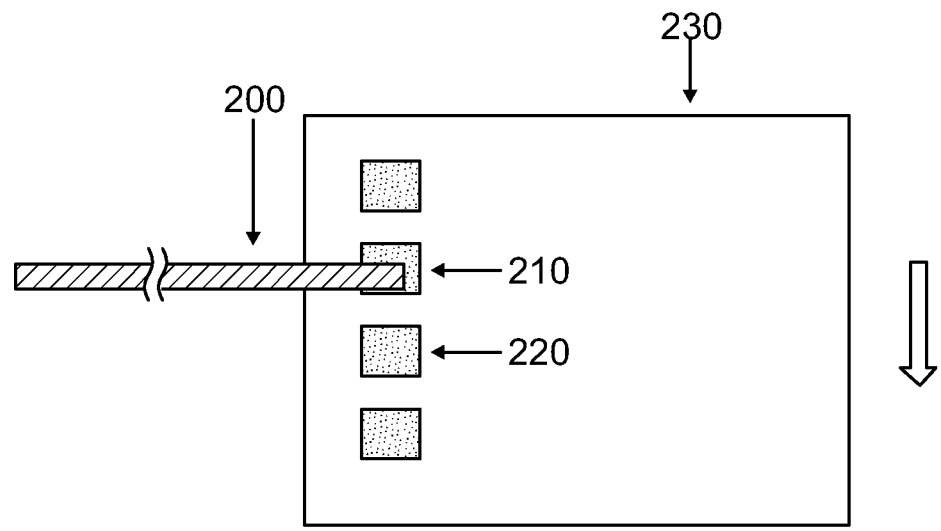
FIGS. 2A and 2B illustrate surfaces upon which an electrical element may be printed in accordance with one or more embodiments of the present invention.
Figure 2B:
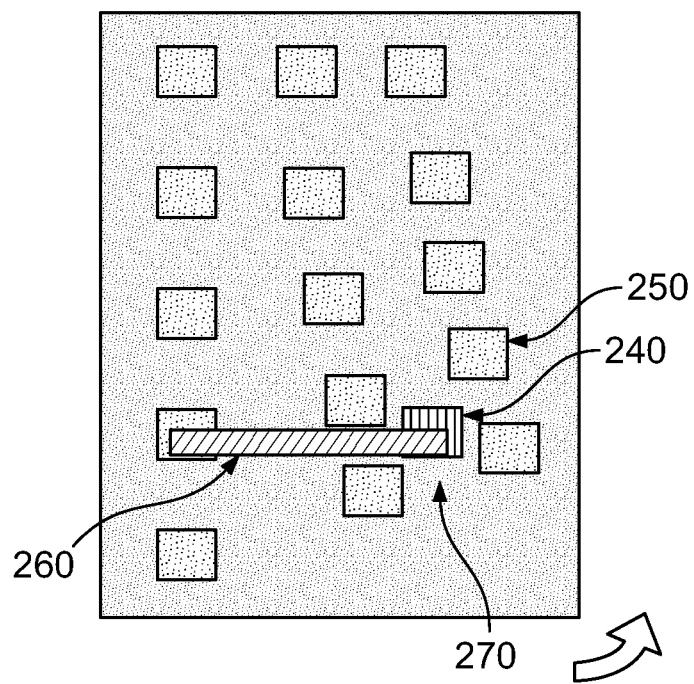

As expected, the electrical traces (or optical waveguides) printed by any of these direct write printers will follow a specified toolpath, based upon the corresponding motions of the CNC-controlled translation stage. Issues arise, however, when discrepancies exist between the desired toolpath and the specified toolpath. Such discrepancies can arise when the specified toolpath is based upon an erroneous assumption as to the actual locations of the end points of the toolpath. For example, an end point may correspond to a bond pad on an IC die, but the IC die, and thus the bond pad, may be slightly translated and/or rotated from an assumed position. Depending upon the size of the bond pad and the width of the electrical trace, the resultant trace 200 may be printed on a bond pad 210 adjacent to the desired bond pad 220, as illustrated in FIG. 2A. (As illustrated in FIG. 2A, the die 230 has slightly translated in the vertical direction.) To compensate for any translation and/or rotation of the IC die 230, and thus the bond pads on the IC die 230, the toolpath of the direct write printer needs to be adjusted from an expected toolpath to a corrected toolpath, resulting in adaptive printing by the direct write printer. FIG. 2B illustrates an example in which various elements have been potted, for example in epoxy, and may have shifted during the potting process. (As illustrated in FIG. 2B, this shifting has caused the various elements to fan-out due to an expansion in the horizontal direction and a contraction in the vertical direction.) As illustrated in FIG. 2B, an element has shifted from its expected position 240 to an actual position 250. In this example, the end of the trace 260, based upon the expected toolpath, would be located on an epoxy street 270 adjacent the actual position 250 of the element.

Virtually identical issues can arise when using optical signals. For example, an end point may correspond to an optical port on a photonic integrated circuit (PIC), but the PIC, and thus the optical port, may be slightly translated and/or rotated from an assumed position. End points may also correspond to optical ports in the form of an output from an optical source, for example, a laser or a light emitting diode (LED), or an input to an optical detector, for example, a photodiode. The term "optical die" refers to one or more of a PIC, an optical source, or an optical detector. Depending upon the size of the optical port and the width of the waveguide, the resultant waveguide may be printed to an optical port adjacent to the desired optical port. To compensate for any translation and/or rotation of the optical die, and thus the optical port(s) on the optical die, the toolpath of the direct write printer needs to be adjusted from an expected toolpath to a corrected toolpath, again resulting in adaptive printing by the direct write printer. While the following discussion generally describes the case of electrical traces, as will be appreciated by one of skill in the art, the case of optical waveguides will be very similar.

To determine the corrected toolpath, one of the most critical issues is determining the actual location of the various elements, whether the elements are IC die with corresponding bond pads, or simply individual elements that have, for example, been potted. With respect to at least one embodiment of the present invention, this requires the use of an imager. Unfortunately, the imager is faced with conflicting requirements. To determine the location of bond pads scattered across several IC die on a large carrier substrate, the field of view of the imager must be wide. However, to accurately determine the actual location of the bond pads on the IC die, for example, to within a few micrometers, each individual pixel in the imager must have a very narrow field of view. To simultaneously meet both the imager wide field of view and the imager pixel very narrow field of view requires an extremely large format imager, with perhaps a billion pixels depending upon the size of the large carrier substrate. To the extent such imagers exist, they are likely so physically large that they are incompatible with the direct write printer.

Using an imager that is compatible with the direct write printer thus requires stitching together multiple images to create an image that simultaneously meets both the wide overall imager field of view and the very narrow individual pixel field of view. Depending upon the overall field of view, even this approach can readily require stitching together hundreds of individual images. The process of stitching together hundreds of individual images can be very time and computer intensive. Thus, a more efficient way of stitching together potentially hundreds of images to create a master actual position image of a carrier substrate with multiple IC die and corresponding bond pads, or simply individual elements that have, for example, been potted, is required.

Figure 3A:
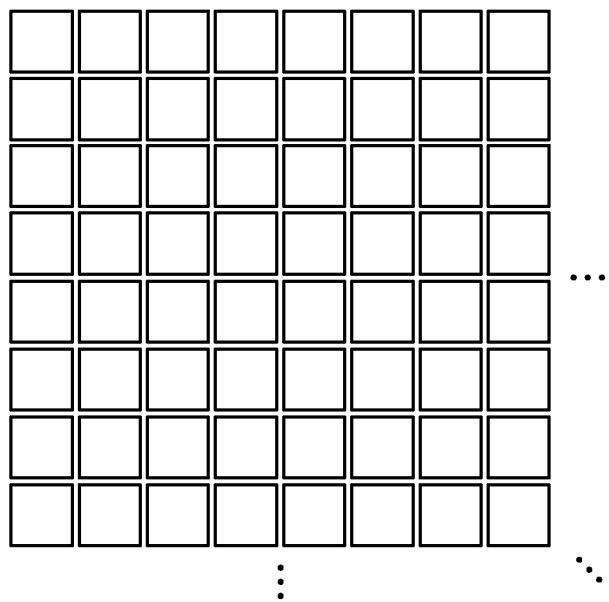
FIGS. 3A-3C illustrate a hierarchical stitching process in accordance with one or more embodiments of the present invention.
Figure 3B:
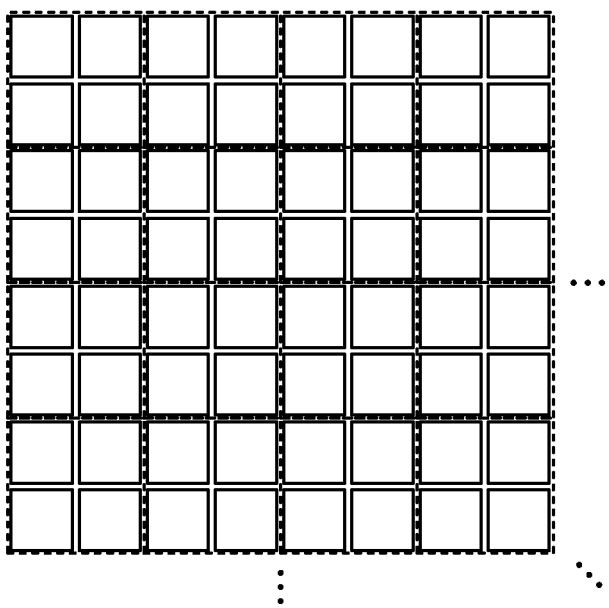
Figure 3C:
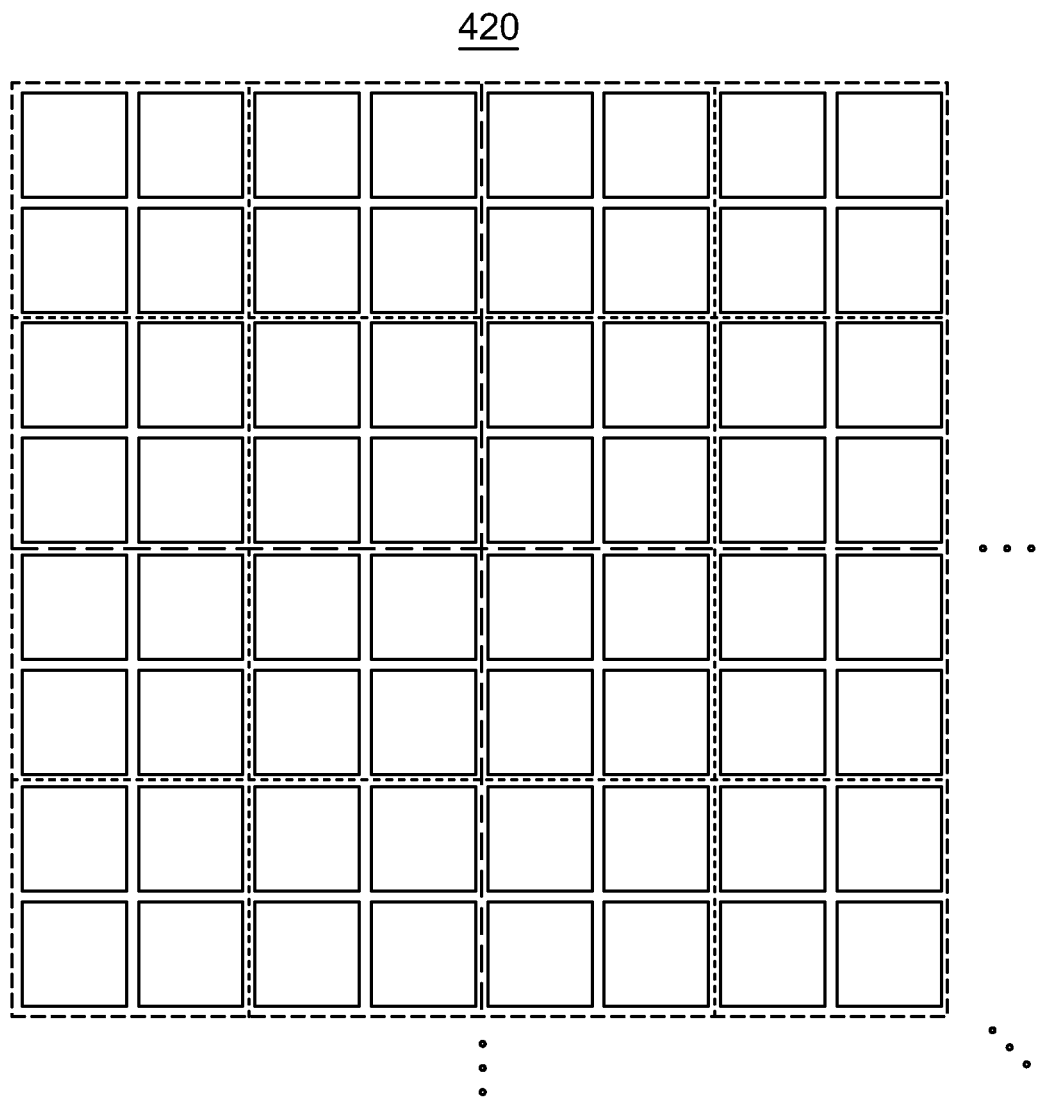

In at least one embodiment of the present invention, this stitching process is hierarchical, as illustrated in FIGS. 3A-3C. FIG. 3A shows a portion of a two-dimensional (2D) array of images that must be stitched together. These images were taken, for example, at known positions of a CNC-controlled translation stage using an imager mounted to a printer gantry in the direct write printer. To ensure complete coverage of the master actual position image, each of the individual images slightly overlaps its neighboring images on all sides, a simple process given the positional resolution of the CNC-controlled translation stage. (Note, however, that for the sake of clarity with respect to the following description, the images are not illustrated as overlapping, for reasons that will be clear in the following description.) A first attempt to simultaneously stitch together 200 such images from a 5 mega-pixel camera did not converge, even after running overnight. The hierarchical stitching process was born out of this original time and computer intensive process.

In a first step in the hierarchical stitching process, 2×2 blocks of images are stitched together, as illustrated in FIG. 3B, thereby creating an array of what will be termed "4-block images." As only four images are being simultaneously stitched together to form each 4-block image, this is a very rapid process, i.e., it is not overly computationally intensive. The result is an array of 4-block images. The next step in the hierarchical stitching process, as illustrated in FIG. 3C, stitches together 2×2 blocks of 4-block images, thereby creating an array of what will be termed "16-block images." As before, since only four 4-block images are being simultaneously stitched together to form each 16-block image, this is a rapid process, though admittedly slower than the stitching process that creates the 4-block images. The result is an array of 16-block images. This hierarchical stitching process continues, stitching together 2×2 blocks of ever larger block images, until all of the original images have been stitched together to generate the final master actual position image. The hierarchical stitching process is thus a power of four process, i.e., $4^i$ process, in terms of the number of images being stitched together. In the first stage, a 2×2 array of $4^0$, i.e., 1 or single images are combined to form a $4^1$, i.e., 4-block, image, as illustrated in FIG. 3B. In the second stage, a 2×2 array of $4^1$, i.e., 4-block images are combined to form a $4^2$, i.e., 16-block, image, as illustrated in FIG. 3C. In a third stage, a 2×2 array of $4^2$, i.e., 16-block images are combined to form a $4^3$, i.e., 64-block, image, etc. This hierarchical stitching process may be hundreds of times faster than stitching together all of the individual images simultaneously.

While the above described and illustrated hierarchical stitching process employed 2×2 blocks of images, this is not required. In other embodiments, the blocks of images being stitched together may be, for example, 2×3 or 3×3, or even larger. In other words, the hierarchical stitching process may stitch together A×B blocks of images, resulting in $(A \times B)^i$-block images, as opposed to the described and illustrated $4^i$-block images. The key to the hierarchical stitching process is to not employ blocks of images that are so large that the stitching process becomes too computationally intensive.

The image taken by the imager can be calibrated, for example, by taking an image of a 2D calibration target having known feature sizes and locations. The master actual position image can thus be converted into a master actual position map, which corresponds to the actual positions of the various elements in real-space. With this master actual position map, the CNC-controlled translation stage can be controlled so that the direct write printer prints traces between the actual positions of the various elements, not between the expected positions of the various elements.

Once the master actual position map has been generated, it is compared to a master expected position map, i.e., a map of the expected or nominal locations of the various IC die, corresponding bond pads, individual elements of a device, etc. The master expected position map may, for example, be based upon a CAD drawing of the carrier substrate and the various IC die with corresponding bond pads, individual elements of a device, etc. The output of this comparison is the identification of each of the various IC die, corresponding bond pads, individual elements of a device, etc., in the master actual position map.

Once the various IC die, corresponding bond pads, individual elements of a device, etc., are identified in the master actual position map, the toolpaths required for the direct write printer to print the traces can be generated. In a first set of embodiments, expected trace locations are known and updated to become actual trace locations based upon the identifications found in the master actual position map. In a second set of embodiments, the actual trace locations are generated based on the identifications found in the master actual position map. In both sets of embodiments, toolpaths are generated based upon the actual trace locations. With the toolpaths for the actual trace locations now generated, the toolpaths are used to CNC-control the motion of a translation stage such that the traces are accurately printed by the direct write printer.

Figure 4:
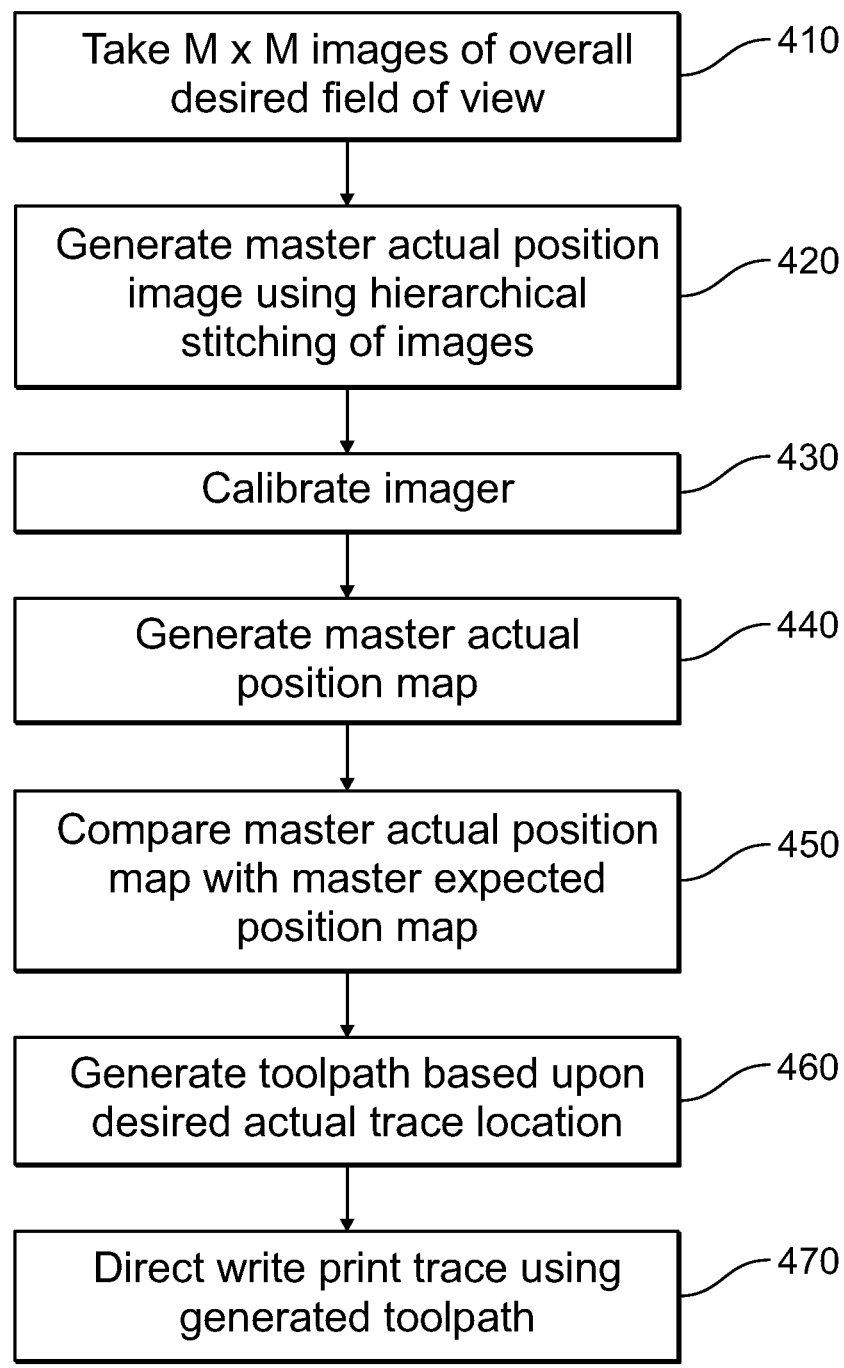
FIG. 4 illustrates a flowchart of an adaptive printing process in accordance with one or more embodiments of the present invention.

A high level flowchart of the overall adaptive printing process 400 in accordance with at least one embodiment is illustrated in FIG. 4. In step 410, an array of N, i.e., M×M, overlapping images is taken by an imager to cover the desired overall field of view, for example, a large carrier substrate with its various IC die, corresponding bond pads, individual elements of a device, etc. In step 420, the array of N overlapping images are stitched together using a hierarchical stitching process to generate a master actual position image. In step 430, the imager is calibrated. In step 440, a master actual position map is generated based upon the master actual position image from step 420 and the calibration data from step 430. In step 450, the master actual position map is compared to a master expected position map to identify the various features in the master actual position map using, for example, an image correlation algorithm. In step 460, one or more actual trace locations are determined, and corresponding toolpath(s) are generated. In step 470, the toolpath(s) generated in step 460 are used to CNC-control a translation stage such that a direct write printer prints trace(s) in the correct locations.

While the adaptive printing process 400 is described employing a square overall field of view, i.e., M×M overlapping images, other overall field of view shapes are possible. For example, the overall field of view may be rectangular or circular depending, for example, on the shape of the carrier substrate.

Figure 5:
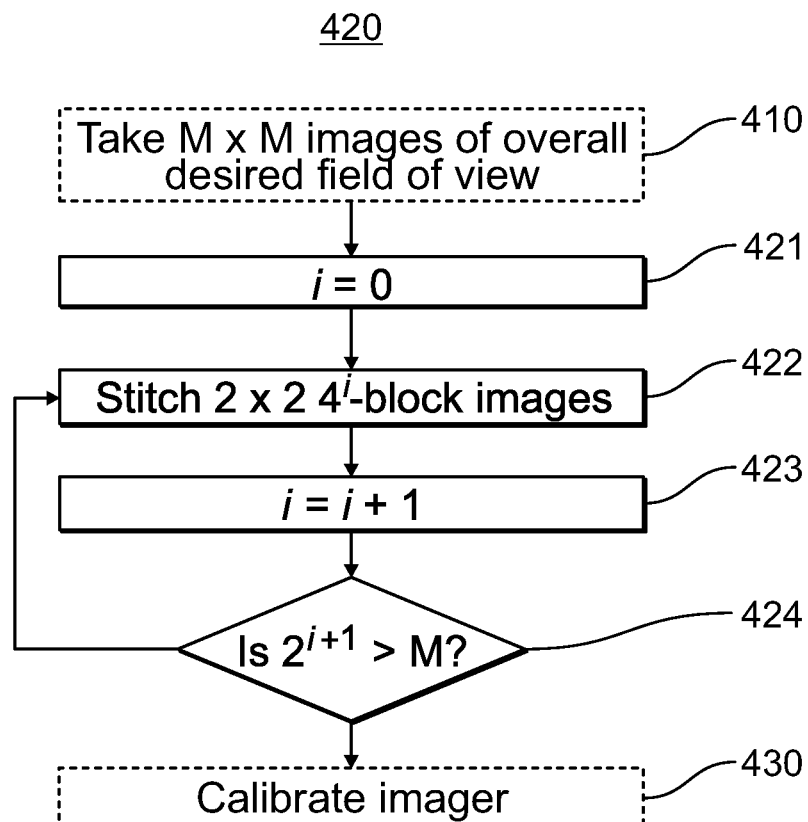
FIG. 5 illustrates a flowchart of a hierarchical stitching process that may be used in an adaptive printing process in accordance with one or more embodiments of the present invention.

FIG. 5 illustrates a flowchart of the hierarchical stitching process sub-steps taken in step 420 of FIG. 4. In step 421, a counter i is set to 0. In step 422, 2×2 $4^i$-block images are stitched together to form corresponding $4^{i+1}$-block images. (When i=0, each of the $4^i$-block images is a single image.) Step 422 is repeated until all N overlapping images have been processed to form an array of $4^{i+}$-block images. In step 423, the counter i is incremented by 1, i.e., i=i+1. In step 424, it is determined if step 422 should be repeated, i.e., $2^{i+} \leq M$. If $2^{i+} \leq M$, then the N overlapping images have not been stitched together to form a single image, i.e., the master actual position image, and step 422 is repeated. If $2^{i+1} > M$, then the master actual position image has been formed as all N overlapping images have been stitched together to form a single image.

The flowchart of the hierarchical stitching process sub-steps taken in step 420, as illustrated in FIG. 5, assumes a square array of N images, with each side of the array corresponding to M images, i.e., N=M×M. As the field of view may not be square, the array of N images may likewise not be square. In this case, the hierarchical stitching process sub-steps taken in step 420, as illustrated in FIG. 5, can be revised to handle, for example, a rectangular or circular field of view, with its corresponding array of N images, though the stitching together of 2×2 $4^i$-block images is retained.

Figure 6:
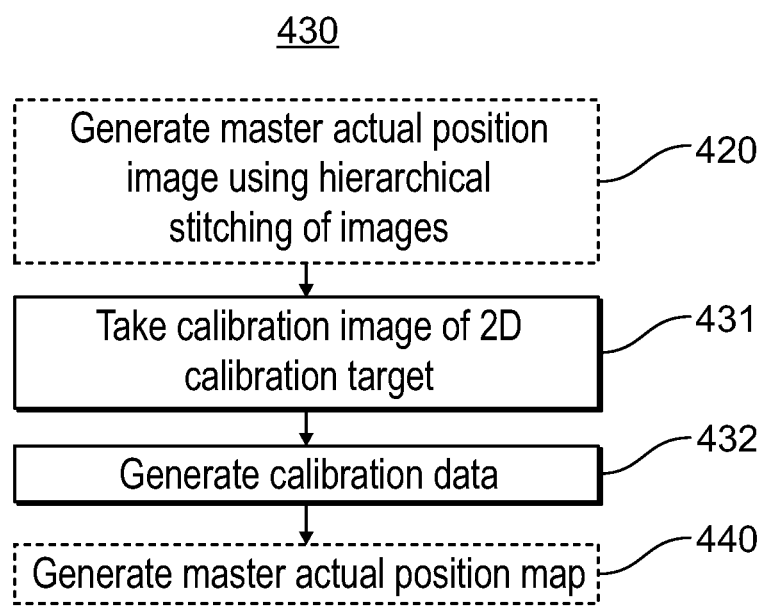
FIG. 6 illustrates a flowchart of a calibration process that may be used in an adaptive printing process in accordance with one or more embodiments of the present invention.

FIG. 6 illustrates a flowchart of the calibration process sub-steps taken in step 430 of FIG. 4. In step 431, the imager takes a calibration image of a 2D calibration target having known feature sizes and locations. In step 432, calibration data is generated to convert the calibration image into a calibration actual position map. This calibration data, for example, takes into account magnification in the X and Y directions between the 2D calibration target and the calibration image. This calibration data may also take into account any translation or rotation between the 2D calibration target and the calibration image.

While these adaptive printing processes are illustrated and described as being a series of steps that are performed in a sequence, it is to be understood and appreciated that the processes are not limited by the order of the sequence. For example, some steps can occur in a different order than what is described herein. In addition, a step can occur concurrently with another step. Further, in some embodiments, not all steps may be required to implement a process described herein.

While the above description has been directed to using a direct write printer to print electrical interconnects, for example, traces, between individual elements, this is not required in all embodiments. For example, a direct write printer may print other electrical elements. As an example, a direct write printer may be used to print a resistor between two elements by using an ink that produces the desired resistance. As another example, a direct write printer may be used to print an inductor, a transformer, or a capacitor between two elements. Specifically, while a direct write printer may print a low resistance element using a first, conductive-material-containing ink, the direct write printer may print a dielectric element using a second, dielectric-material-containing ink. By printing successive layers of a first low resistance element, a dielectric element, and a second low resistance element, one can print a planar capacitor. A similar process may, for example, be used to print a spiral inductor or a transformer. Thus, a number of electrical elements, including, for example, traces, resistors, inductors, transformers, capacitors, or combinations thereof, may be accurately positioned using a direct write printer.

Further, while the above description has been directed to using a direct write printer to print electrical interconnects or electrical elements between individual elements, this is not required in all embodiments. For example, a direct write printer may print optical interconnects. As an example, a direct write printer may be used to print a waveguide between two elements by using an ink that produces a waveguide having the desired index or refraction. This waveguide may take one of at least two forms. In a first case, the waveguide employs just a core, while in a second case, the waveguide includes both a core and a cladding layer, which reduces optical losses. This core/cladding waveguide requires multiple toolpaths. For example, a first toolpath may be used to form a bottom portion of the cladding layer on the carrier substrate, a second toolpath may be used to form the core, third and fourth toolpaths may be used to form portions of the cladding layer on either side of the core, while a fifth toolpath may be used to form a top portion of the cladding layer. In other embodiments, the first toolpath may be omitted, with the carrier substrate acting as the bottom portion of the cladding layer.

A similar process may, for example, be used to print optical couplers or optical splitters. In even more complex cases, a phase shifter, optical attenuator, or interferometer may be printed. These more complex devices will require printing the core with an ink that has, for example, electro-optical or thermo-optical properties when cured, i.e., an electro-optical- or a thermo-optical-material-containing ink. Due to the flexibility of the direct write printing process, a complex optical interconnect can be printed along with corresponding electrical elements. For example, an optical phase shifter element may be printed, with electrodes printed on either side to generate the electrical field needed to induce the electro-optical effect required for phase shifting. Thus, as will be appreciated by one of skill in the art, with the requisite inks, direct write printers may print electrical interconnects, optical interconnects, and combinations thereof.

Figure 7:
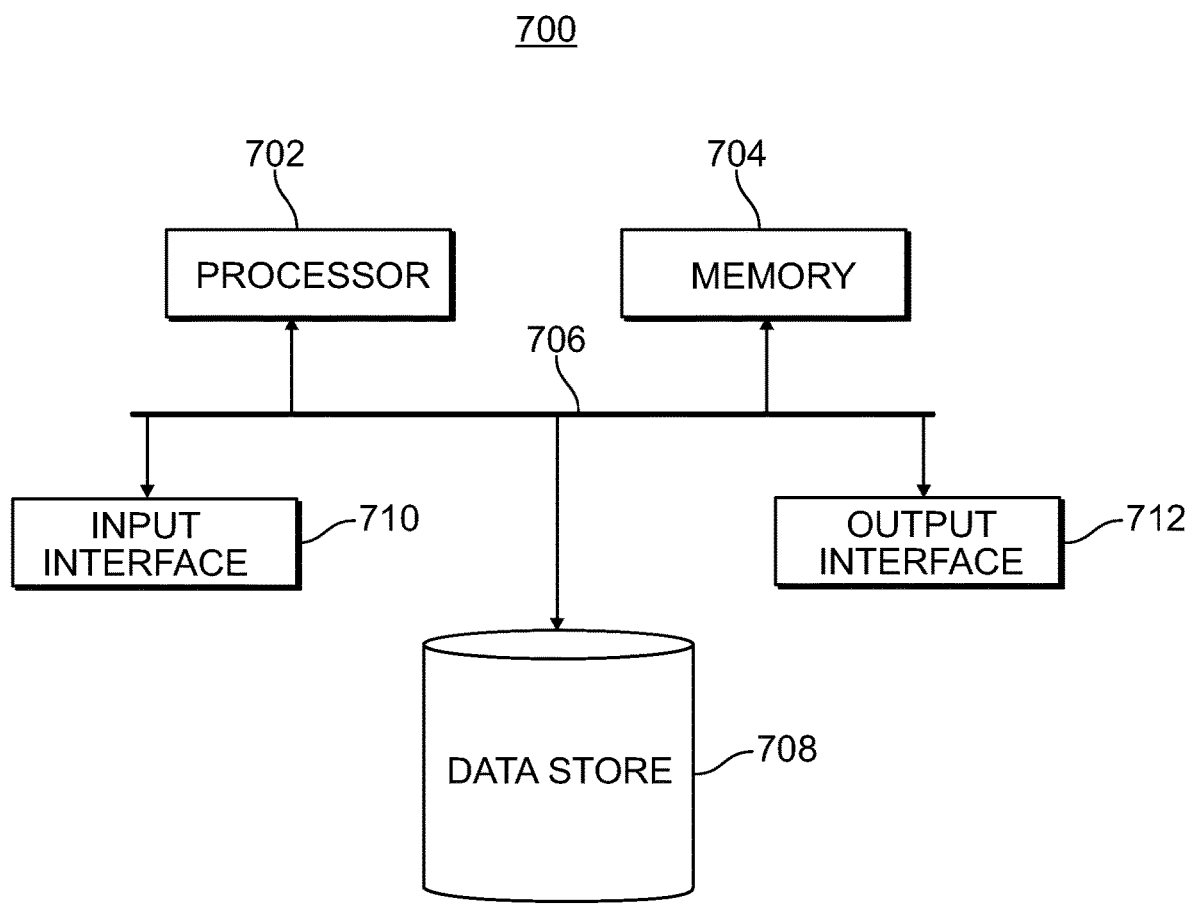
FIG. 7 illustrates an exemplary computing device that may be used in an adaptive printing process in accordance with one or more embodiments of the present invention.

An exemplary computing device 700, such as that illustrated in FIG. 7, may be employed to undertake the various processes described above, including, for example, the hierarchical stitching process (corresponding generally to step 420), generating the master actual position map (corresponding generally to step 440), comparing the master actual position map with the master expected position map (corresponding generally to step 450), generation of toolpaths (corresponding generally to step 460), and CNC-control of a translation stage (corresponding generally to step 470). The computing device 700 includes at least one processor 702 that executes instructions that are stored in a memory 704. The instructions may, for instance, be instructions for implementing functionality, processes, or methods described above and illustrated, for example, in FIGS. 4-6. The processor 702 may access the memory 704 by way of a system bus 706. In addition to storing executable instructions, the memory 704 may also store data corresponding, for example, to the calibration data.

The computing device 700 additionally includes a data store 708 that is accessible by the processor 702 by way of the system bus 706. The data store 708 may include executable instructions, the master expected position map, etc. The computing device 700 also includes an input interface 710 that allows external devices to communicate with the computing device 700. For instance, the input interface 710 may be used to receive instructions from an external computer device, from a user, data from an imager, etc. The computing device 700 also includes an output interface 712 that interfaces the computing device 700 with one or more external devices. For example, the computing device 700 may display text, images, etc., by way of the output interface 712. The computing device 700 may also CNC-control a translation stage via the output interface 712.

It is contemplated that the external devices that communicate with the computing device 700 via the input interface 710 and the output interface 712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 700 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for adaptive printing of an element using a direct write printer, the method comprising the steps of:
    using an imager, taking a plurality of images of a surface upon which the element is to be direct write printed, each of the plurality of images overlapping a portion of each adjacent image;
    stitching together the plurality of images using a hierarchical stitching process to thereby generate a master actual position image;
    calibrating the imager using the imager to take a calibration image of a two-dimensional calibration target and to thereby generate calibration data;
    generating a master actual position map based upon the master actual position image and the calibration data;
    comparing the master actual position map to a master expected position map, the master expected position map including expected locations of one or more features on the surface and corresponding identities of the one or more features to thereby identify the one or more features in the master actual position map;
    determining an actual location on the surface for the element based upon the master actual position map with the thus identified one or more features;
    generating a toolpath corresponding to the thus determined actual location on the surface for the element; and
    using the direct write printer, direct write printing the element based upon the thus generated toolpath.

2. The method of claim 1, wherein the element is an electrical element, the electrical element including at least one of a trace, a resistor, an inductor, a transformer, or a capacitor.

3. The method of claim 1, wherein the element is an optical element, the optical element including at least one of a waveguide, an optical coupler, or an optical splitter.

4. The method of claim 1, wherein the element includes at least one of a phase shifter, an optical attenuator, or an interferometer.

5. The method of claim 1, wherein the direct write printer is one of an aerosol jet printer, a direct ink writer, or an ink jet printer.

6. The method of claim 1, wherein the hierarchical stitching process includes the steps of:
    setting a counter i to zero;
    stitching together 2×2 $4^i$-block images from the plurality of images to thereby create $4^{i+1}$-block images;
    determining whether one $4^{i+1}$-block image includes each of the plurality of images; and
    when the one $4^{i+1}$-block image does not include each of the plurality of images, incrementing the counter i and repeating the steps of stitching and determining.

7. The method of claim 1, wherein the hierarchical stitching process includes the steps of:
    setting a counter i to zero;
    stitching together A×B $(A \times B)^i$-block images from the plurality of images to thereby create $(A \times B)^{i+1}$-block images;
    determining whether one $(A \times B)^{i+1}$-block image includes each of the plurality of images; and
    when the one $(A \times B)^{i+1}$-block image does not include each of the plurality of images, incrementing the counter i and repeating the steps of stitching and determining.

8. The method of claim 1, wherein the calibration data compensates for at least one of magnification, translation, or rotation between the two-dimensional calibration target and the calibration image.

9. The method of claim 1,
    wherein the master expected position map includes a CAD drawing of one or more of a carrier substrate, one or more IC die, one or more bond pads of the one or more IC die, one or more optical die, one or more optical ports of the one or more optical die, or individual elements of a device; and
    wherein the one or more of the carrier substrate, one or more IC die, one or more bond pads of the one or more IC die, one or more optical die, one or more optical ports of the one or more optical die, or individual elements of the device correspond to the one or more features on the surface.

10. The method of claim 1, wherein the step of direct write printing employs at least one ink, each of the at least one inks containing one of a conductive material, a magnetic material, a dielectric material, a ceramic material, a monomer material, a polymer material, an electro-optical material, or a thermo-optical material.

11. A computer-readable storage media comprising instructions to implement adaptive printing of an element using a direct write printer, the instructions to implement the steps comprising:
- using an imager, taking a plurality of images of a surface upon which the element is to be direct write printed, each of the plurality of images overlapping a portion of each adjacent image;
- stitching together the plurality of images using a hierarchical stitching process to thereby generate a master actual position image;
- calibrating the imager using the imager to take a calibration image of a two-dimensional calibration target and to thereby generate calibration data;
- generating a master actual position map based upon the master actual position image and the calibration data;
- comparing the master actual position map to a master expected position map, the master expected position map including expected locations of one or more features on the surface and corresponding identities of the one or more features to thereby identify the one or more features in the master actual position map;
- determining an actual location on the surface for the element based upon the master actual position map with the thus identified one or more features;
- generating a toolpath corresponding to the thus determined actual location on the surface for the element; and
- using the direct write printer, direct write printing the element based upon the thus generated toolpath.

12. The computer-readable storage media of claim 11, wherein the element is an electrical element, the electrical element including at least one of a trace, a resistor, an inductor, a transformer, or a capacitor.

13. The computer-readable storage media of claim 11, wherein the element is an optical element, the optical element including at least one of a waveguide, an optical coupler, or an optical splitter.

14. The computer-readable storage media of claim 11, wherein the element includes at least one of a phase shifter, an optical attenuator, or an interferometer.

15. The computer-readable storage media of claim 11, wherein the direct write printer is one of an aerosol jet printer, a direct ink writer, or an ink jet printer.

16. The computer-readable storage media of claim 11, wherein the hierarchical stitching process includes the steps of:
- setting a counter i to zero;
- stitching together 2×2 $4^i$-block images from the plurality of images to thereby create $4^{i+1}$-block images;
- determining whether one $4^{i+1}$ block image includes each of the plurality of images; and
- when the one $4^{i+1}$-block image does not include each of the plurality of images, incrementing the counter i and repeating the steps of stitching and determining.

17. The computer-readable storage media of claim 11, wherein the hierarchical stitching process includes the steps of:
- setting a counter i to zero;
- stitching together (A×B) $(A×B)^i$-block images from the plurality of images to thereby create $(A×B)^{i+1}$-block images;
- determining whether one $(A×B)^{i+1}$-block image includes each of the plurality of images; and
- when the one $(A×B)^{i+1}$-block image does not include each of the plurality of images, incrementing the counter i and repeating the steps of stitching and determining.

18. The computer-readable storage media of claim 11, wherein the calibration data compensates for at least one of magnification, translation, or rotation between the two-dimensional calibration target and the calibration image.

19. The computer-readable storage media of claim 11,
- wherein the master expected position map includes a CAD drawing of one or more of a carrier substrate, one or more IC die, one or more bond pads of the one or more IC die, one or more optical die, one or more optical ports of the one or more optical die, or individual elements of a device; and
- wherein the one or more of the carrier substrate, one or more IC die, one or more bond pads of the one or more IC die, one or more optical die, one or more optical ports of the one or more optical die, or individual elements of the device correspond to the one or more features on the surface.

20. The computer-readable storage media of claim 11, wherein the step of direct write printing employs at least one ink, each of the at least one inks containing one of a conductive material, a magnetic material, a dielectric material, a ceramic material, a monomer material, a polymer material, an electro-optical material, or a thermo-optical material.

* * * * *